US009315059B2

(12) United States Patent
Nishikawa

(10) Patent No.: US 9,315,059 B2
(45) Date of Patent: Apr. 19, 2016

(54) PRINTING APPARATUS

(71) Applicant: Seiko Epson Corporation, Tokyo (JP)

(72) Inventor: Saori Nishikawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/746,263

(22) Filed: Jun. 22, 2015

(65) Prior Publication Data

US 2015/0367661 A1     Dec. 24, 2015

(30) Foreign Application Priority Data

Jun. 24, 2014  (JP) ................................. 2014-129575

(51) Int. Cl.
*B41J 29/38* (2006.01)
(52) U.S. Cl.
CPC ...................................... *B41J 29/38* (2013.01)
(58) Field of Classification Search
CPC ..................................................... B41J 29/38
USPC ............................................................ 347/9
See application file for complete search history.

(56) References Cited

U.S. PATENT DOCUMENTS

| 8,814,303 | B2 | 8/2014 | Mano | |
| 2002/0027670 | A1* | 3/2002 | Takahashi | ............ H04N 1/4095 358/1.9 |
| 2003/0137698 | A1* | 7/2003 | Pritchard | ............. H04N 1/4052 358/3.06 |
| 2004/0090489 | A1* | 5/2004 | Hayashi | ................ B41J 2/2132 347/41 |
| 2009/0213396 | A1* | 8/2009 | Togami | ................ H04N 1/6072 358/1.9 |
| 2011/0012947 | A1* | 1/2011 | Matsuhira | .......... H04N 1/40031 347/9 |

FOREIGN PATENT DOCUMENTS

| JP | 2006-163672 A | 6/2006 |
| JP | 2006-163673 A | 6/2006 |
| JP | 2012-011616 A | 1/2012 |

* cited by examiner

*Primary Examiner* — Lam Nguyen
*Assistant Examiner* — Alexander D Shenderov

(57) ABSTRACT

A image process unit includes program memory units that each store a corresponding one of programs for an image processing; a data memory unit that stores therein a set of image data; a program memory bus that interconnects a data analysis unit and the image process unit and carries a printing command; a data memory bus that interconnects the data analysis unit and the image process unit and carries the set of image data; a color conversion process unit that performs color conversion processing on the set of image data on the basis of the printing command and one of the programs; a halftone process unit that performs halftone processing on the set of image data having been subjected to the color conversion processing, on the basis of the printing command and the other one of the programs. The color conversion processing and the halftone processing are performed in parallel.

4 Claims, 3 Drawing Sheets

TIME

TIME

PRINTING APPARATUS

BACKGROUND

1. Technical Field

The present invention relates to a printing apparatus including an image process portion.

2. Related Art

Existing printing apparatuses include a printing head that includes a plurality of nozzles formed therein through which inks are ejected onto a printed medium such as paper; and a control apparatus that performs printing processing for printing images on the printed medium by driving the printing head. For the purpose of high-quality image printing, blocks of image data of high resolution are sequentially transmitted to the control apparatus from an external apparatus. Every time the control apparatus receives such a block of image data, the control apparatus stores the block of image data into a buffer unit, and concurrently therewith, the control apparatus performs the printing processing on the basis of blocks of image data having been stored in the buffer unit. In such an existing printing apparatus, however, when a data volume of each block of image data is large, it takes a long time until the completion of transmission of each block of image data, thereby causing a situation in which a waiting time for waiting for a subsequent completion of transmission of a block of image data occurs and this occurrence of waiting time brings printing operation into a waiting state. Further, during this waiting state, a previously printed portion on the printed medium becomes dry, thereby resulting in a situation in which drying unevenness occurs.

With respect to such a problem, there is proposed a printing apparatus in which an image process portion that performs color conversion processing and halftone processing is provided for the purpose of shortening a period of time required to complete transmission of image data from an external apparatus to the printing apparatus. This image process portion included in such a printing apparatus repeatedly executes the color conversion processing and the halftone processing in this order on image data corresponding to several rasters and received from the external apparatus, until all rasters of image data are processed. In the case where, however, the processing capacity of the image process portion is low, a period of time required for the color conversion processing and the halftone processing on image data becomes long, thereby still causing a situation in which a waiting time occurs. Thus, there is still room for improvement in reduction of the situations in which the drying unevenness occurs.

Thus, there is proposed a printing apparatus configured to, in the case where it takes a long time for such an image process portion to complete its processing on each block of image data, reduce the situations in which the drying unevenness occurs by shortening a period when printing operation is in such a waiting state, through a method of narrowing the sub-scanning direction size of each region existing on the printed medium and being subjected to printing through a corresponding movement (pass) of the printing head in a main-scanning direction (refer to, for example, JP-A-2012-11616).

This method, however, of narrowing the sub-scanning direction size of each region existing on the printed medium and being subjected to printing through a corresponding pass of the printing head results in increase of the number of passes of the printing head which are required to complete printing of all images onto the printed medium. As a result, a period of time required to complete printing onto the printed medium becomes long.

SUMMARY

An advantage of some aspects of the invention is that a printing apparatus is provided, which enables suppression of lengthening of a printing time required to complete printing onto a printed medium.

Hereinafter, configurations and operation effects of a printing apparatus according to an aspect of the invention will be described.

A printing apparatus according to an aspect of the invention includes a printing head through which printing onto a printed medium is performed; a data analysis unit that analyzes a print job received from an external apparatus and outputs a printing command and a first set of image data; and an image process unit that performs image processing for converting the first set of image data into a set of printing data on the basis of which the printing onto the printed medium is performed. The image process unit includes a program memory bus that communicably interconnects the data analysis unit and the image process unit and carries the printing command; a data memory bus that communicably interconnects the data analysis unit and the image process unit and carries the first set of image data; a program memory unit that stores therein a program for the image processing; a data memory unit that stores therein the first set of image data input from the data analysis unit; a color conversion process unit that performs color conversion processing on the first set of image data on the basis of the printing command and the program for the image processing; and a halftone process unit that performs halftone processing on a second set of image data resulting from the color conversion processing on the first set of image data, on the basis of the printing command and the program for the image processing. The image process unit performs the color conversion processing and the halftone processing in parallel.

In this configuration, the color conversion processing and the halftone processing are performed in parallel. Thus, this configuration makes it possible to shorten a period of time required to complete the image processing. That is, this configuration makes it possible to perform printing of an image on the printed medium without narrowing the sub-scanning direction size of each region existing on the printed medium and being subjected to printing through a corresponding pass (movement) of the printing head in a main-scanning direction. Accordingly, this configuration makes it possible to shorten a printing time required to complete printing.

Further, in the image process unit, if a single bus is used in common to the transfer of the printing command and the transfer of the first set of image data, it is difficult to perform the image processing and transfer the first set of image data in parallel.

In this respect, in the printing apparatus according to the aspect of the invention, the program memory bus and the data memory bus are formed separately from each other, and thus, this configuration makes it possible to execute the image processing and the transfer of the first set of image data in parallel. Thus, this configuration makes it possible to shorten a period of time required to complete the conversion by the image process unit from the first set of image data to the set of printing data.

In the above printing apparatus according to the aspect of the invention, preferably, among a plurality of image areas corresponding to the first set of image data, an image area and another image area that is different from the image area are image-processed by the color conversion unit and the halftone process unit, respectively, in parallel with each other.

According to this configuration, during a period when one of the color conversion processing and the halftone processing is performed on a certain image area among the plurality of image areas corresponding to the first set of image data, the other one of the color conversion processing and the halftone processing is performed on an image area different from the certain image area. Thus, this configuration makes it possible to shorten a period of time required to complete the image processing.

In the above printing apparatus, preferably, the image process unit further includes a first buffer unit and a second buffer unit; among the plurality of image areas corresponding to the first set of image data, a first image area and a second image area that is different from the first image area are input to the first buffer unit and the second buffer unit, respectively; and the color conversion process unit performs the color conversion processing on the second image area during a period when the halftone process unit performs the halftone processing on the first image area.

The above printing apparatus, preferably, further includes a data process unit that is formed separately from the image process unit and that performs pass division processing for dividing the set of printing data input from the image process unit into subsets of printing data each associated with a corresponding one of passes that are movements of the printing head in a main-scanning direction.

BRIEF DESCRIPTION OF THE DRAWINGS

The invention will be described with reference to the accompanying drawings, wherein like numbers reference like elements.

FIG. 3A is a time chart illustrating timing of processing and processing time with respect to color conversion processing; and FIG. 3B is a time chart illustrating timing of processing and processing time with respect to halftone processing.

DESCRIPTION OF EXEMPLARY EMBODIMENTS

Hereinafter, an embodiment of a printing apparatus will be described with reference to the drawings. In addition, the printing apparatus according to this embodiment is constituted by, for example, an ink jet printer that performs printing by ejecting inks, each being an example of a liquid, onto a printed medium. Further, the printer is a so-called serial printer employing a printing method in which printing onto a printed medium is performed in conjunction with movement of a printing head in a direction intersecting with a transportation direction in which the printed medium is transported. Here, examples of the ink include various liquid compositions, such as a common aqueous ink, a common oil-based ink, a jet ink, and a hot-melt ink.

Figure 1:
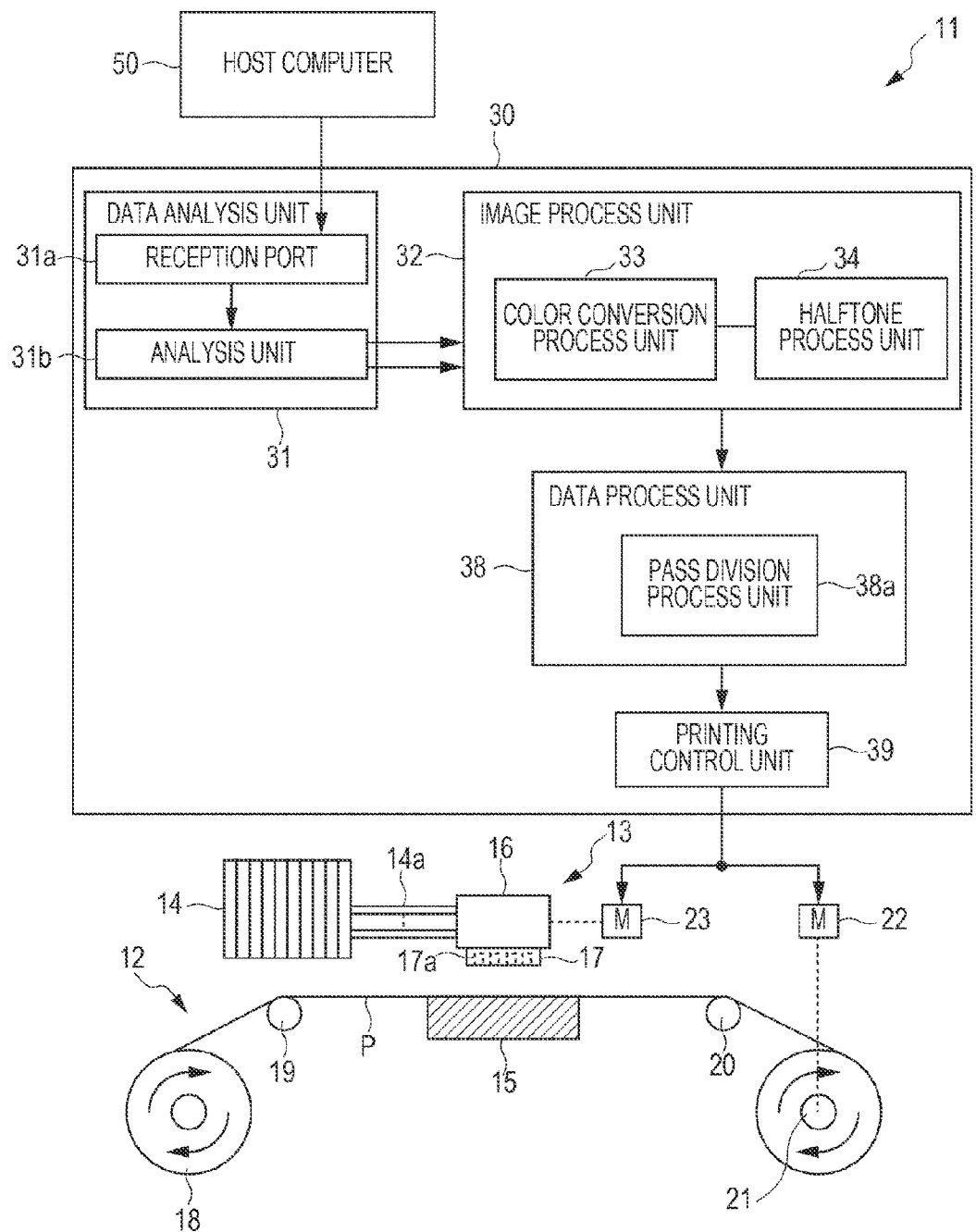
FIG. 1 is a diagram illustrating an outline configuration of a printing apparatus according to an embodiment of the invention.

As shown in FIG. 1, the printing apparatus 11 includes a transportation portion 12 capable of transporting long-size continuous paper P, which is included in examples of a recorded medium; a printing portion 13 that executes printing by ejecting inks onto the continuous paper P while reciprocating in a width direction of the continuous paper P, which intersects with a transportation direction in which the transportation portion 12 transports the continuous paper P (i.e., the width direction being a direction perpendicular to the surface of paper on which FIG. 1 is drawn); and a cartridge 14 that feeds the inks to the printing portion 13. The transportation portion 12 includes a supporting table 15 that is located at a position facing the printing portion 13 in an upward/downward direction and that is capable of bringing the continuous paper P into a horizontal state in which the continuous paper P faces the printing portion 13, and supporting the continuous paper P in the state of keeping it in the horizontal state.

Further, the printing portion 13 includes a moving object 16 that is capable of reciprocating in an area above the supporting table 15 along the width direction of the continuous paper P; and a printing head 17 that is provided on the lower side face of the moving object 16 and that is capable of ejecting the inks onto a an area existing on the continuous paper P and being supported by the supporting table 15. The printing head 17 ejects the inks through nozzles 17a whose openings are arranged on the lower face of the printing head 17 itself. Incidentally, in the printing head 17 of FIG. 1, just four nozzles 17a are illustrated, but, actually, a large number of nozzles 17a are provided so as to form a plurality of nozzle rows extending along a direction orthogonal to a direction in which the printing head 17 moves. Further, the printing head 17 is fed with the inks from the cartridge 14 by being joined to the cartridge 14.

The cartridge 14 contains ten kinds of color inks, such as a cyan (C) ink, a magenta (M) ink, a yellow (Y) ink, and a black (B) ink. The cartridge 14 includes ten feeding paths 14a through which the color inks are fed to the printing head 17 separately from one another. Each of the color inks contained in the cartridge 14 is fed to the printing head 17 by a feeding pump (omitted from illustration) via a corresponding one of the feeding paths 14a.

As shown in FIG. 1, in the transportation portion 12, an unwinding shaft 18 extending in the width direction of the continuous paper P is rotatably provided at a position located at an upstream side of the supporting table 15 in the transportation direction of the continuous paper P (i.e., at a position located at the left-hand side in FIG. 1). Further, the continuous paper P is attached to the unwinding shaft 18 so as to be capable of, in the form of a roll-shaped object resulting from preliminary winding and stacking into a roll shape, rotating integrally with the unwinding shaft 18 around a rotation center that is located at the shaft center of the unwinding shaft 18.

In the transportation portion 12, a first relay roller 19 that winds the continuous paper P having been unwound from the unwinding shaft 18 and guides it toward the supporting table 15 side is rotatably disposed at a position between the unwinding shaft 18 and the supporting table 15 in the transportation direction of the continuous paper P.

In the transportation portion 12, a second relay roller 20 that winds a printing-completed portion constituting the surface of the continuous paper P and having been transported from the supporting table 15 and relays it toward a downstream side in the transportation direction of the continuous paper P (i.e., toward the right-hand side in FIG. 1) is rotatably disposed at a position located at the downstream side of the supporting table 15 in the transportation direction of the continuous paper P.

In the transportation portion 12, a winding shaft 21 extending in the width direction of the continuous paper P is rotatably provided at a position located at the downstream side of the second relay roller 20 in the transportation direction of the continuous paper P. Further, the apical portion of the transportation-direction downstream side edge of the continuous paper P is wound around the winding shaft 21.

As shown in FIG. 1, a PF motor 22, which is a transportation motor, is joined to the winding shaft 21 so as to be capable of driving the winding shaft 21, and a CR motor 23, which is a movement motor, is joined to the moving object 16 so as to be capable of driving the moving object 16. Further, the rotation of the winding shaft 21 in its winding direction (i.e., in the clockwise direction in FIG. 1) in conjunction with the rotation of the PF motor 22 causes the continuous paper P to be unwound from the unwinding shaft 18 and be transported toward the downstream side in the transportation direction. Further, the movement of the moving object 16 in a scanning direction orthogonal to (intersecting with) the transportation direction of the continuous paper P in conjunction with the rotation of the CR motor 23 enables the printing head 17 to perform printing operation of ejecting the inks onto the continuous paper P.

Further, as shown in FIG. 1, the printing apparatus 11 includes a control apparatus 30 that controls the rotation states of the PF motor 22 and the CR motor 23, and the ejection states of the inks ejected from the printing head 17. This control apparatus 30 includes a data analysis unit 31, an image process unit 32, a data process unit 38, and a printing control unit 39. The data analysis unit 31, the data process unit 38, and the printing control unit 39 are each constituted by a corresponding one of separately provided microcomputers. The image process unit 32 is constituted by a digital signal processor (DSP) and includes two DSP cores.

The data analysis unit 31 includes a reception port 31*a* capable of receiving a print job having been transmitted from a host computer 50, which is included in examples of an external apparatus, and an analysis unit 31*b* that analyzes the print job having been received by the reception port 31*a*. The analysis unit 31*b* analyzes the received print job and outputs a printing command and a set of RGB image data. The printing command includes a kind of the continuous paper P, a width size of the continuous paper P, a printing start position of the printing head 17 in the scanning direction, and the like.

The image process unit 32 includes a color conversion process unit 33 that is a first DSP core as well as a halftone process unit 34 that is a second core. The image process unit 32 converts the set of RGB data into blocks of printing data on the basis of which printing onto the continuous paper P is performed, and outputs the blocks printing data to the data process unit 38.

The color conversion process unit 33 converts a block of RGB data having been received from the data analysis unit 31 into a block of image data for printing, which includes, for each pixel, grayscale levels each associated with a corresponding one of the ten colors for use in printing, by using a color conversion table (a look-up table) which is omitted from illustration. An example of this block of image data for printing is a block of 256-grayscale-level image data including, for each pixel, 256-grayscale levels each associated with a corresponding one of the ten colors.

The halftone process unit 34 converts the block of 256-grayscale-level image data into a block of 2-grayscale-level image data by using a publicly known method, such as a systematic dither method or an error diffusion method. This block of 2-grayscale-level image data includes, for each pixel, pieces of dot data each being associated with a corresponding one of the ten colors and indicating which of two kinds of dot formations is to be applied to a dot corresponding to the relevant pixel, a first one being a dot formation in which a dot is formed, a second one being a dot formation in which no dot is formed.

The data process unit 38 includes a pass division process unit 38*a*. This pass division process unit 38*a* divides a block of image data resulting from the halftone processing (i.e., the block of printing data) into sub-blocks of printing data each associated with a corresponding one of N (N≥2) number of main-scanning-direction movements (passes) of the printing head 17 such that raster lines each being a dot raw in which dots align in the main-scanning direction are printed, and outputs a resultant block of image data (i.e., the sub-blocks of printing data) to the printing control unit 39.

Upon reception of the block of image data (i.e., the sub-blocks of printing data resulting from the division for each path) from the data process unit 38, the printing control unit 39 controls the PF motor 22 and the CR motor 23 such that printing operation based on the received sub-blocks of printing data is performed onto the continuous paper P.

Figure 2:
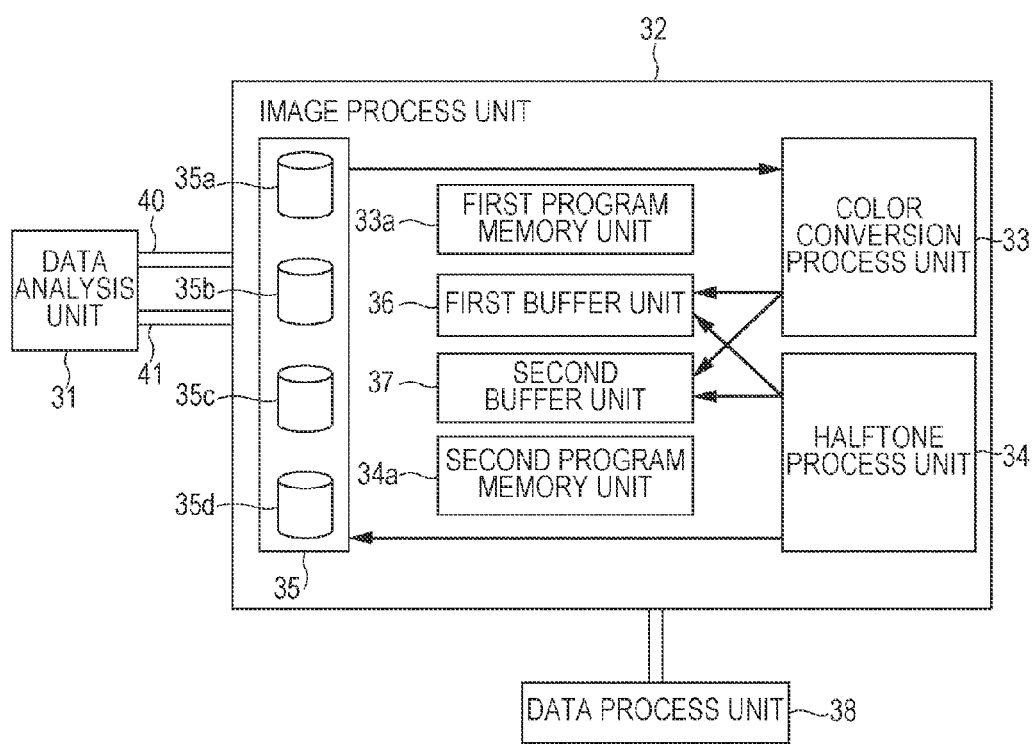
FIG. 2 is a block diagram illustrating a configuration of an image process unit included in the printing apparatus shown in FIG. 1.

As shown in FIG. 2, the image process unit 32 includes not only the color conversion process unit 33 and the halftone process unit 34, but also a data memory unit 35, a first program memory unit 33*a*, a second program memory unit 34*a*, a first buffer unit 36, and a second buffer unit 37. Further, the image process unit 32 is communicably connected to the data analysis unit 31 via a program memory bus 40 and a data memory bus 41. The program memory bus 40 and the data memory bus 41 are also formed in the inside of the image process unit 32, although, in FIG. 2, these buses are not illustrated in the image process unit 32.

Each of the color conversion process unit 33 and the halftone process unit 34 includes an arithmetic logic unit (ALU), a multiplier/accumulator (MAC), and a control unit (these units being omitted from illustration). The control unit controls arithmetic operation of the ALU and the MAC. The color conversion process unit 33 and the halftone process unit 34 are capable of accessing the program memory unit 33*a* and the program memory unit 34*b*, respectively, via the program memory bus 40. Each of the color conversion process unit 33 and the halftone process unit 34 is capable of accessing the data memory unit 35, and the buffer units 36 and 37 via the data memory bus 41.

The first program memory unit 33*a* stores a program for the color conversion processing therein. The control unit of the color conversion process unit 33 executes the color conversion processing on the basis of this program.

The second program memory unit 34*a* stores a program for the halftone processing therein. The control unit of the halftone process unit 34 executes the halftone processing on the basis of this program.

The data memory unit 35 includes a first input memory unit 35*a*, a second input memory unit 35*b*, a first output memory unit 35*c*, and a second output memory unit 35*d*. Each of the input memory units 35*a* and 35*b* stores therein a subset of RGB image data having been input to the each of the input memory units 35*a* and 35*b* from the data analysis unit 31. Each of the output memory units 35*c* and 35*d* stores therein a block of image data resulting from the halftone processing (i.e., a block of printing data) and having been input to the each of the output memory units 35*c* and 35*d*. Each of the output memory units 35*c* and 35*d* outputs the block of printing data to the data process unit 38.

An example of each of the first buffer unit 36 and the second buffer unit 37 is a random access memory (RAM) device. The first buffer unit 36 and the second buffer unit 37 are provided between the data memory unit 35 and a pair of the color conversion process unit 33 and the halftone process unit 34. Each of the buffer units 36 and 37 is accessible from both of the color conversion process unit 33 and the halftone process unit 34.

The printing apparatus 11 configured in this way performs printing operation in the following way.

First, the data analysis unit 31 analyzes a print job having been transmitted from the host computer 50. This print job includes a set of RGB data on the basis of which printing onto the continuous paper P (refer to FIG. 1) is performed. Further, the data analysis unit 31 transmits the print job having been analyzed, to the image process unit 32. In this case, the data analysis unit 31 transmits a subset of RGB image data corresponding to sixty four rasters among the set of RGB image data, to the image process unit 32. After having transmitted the subset of RGB image data corresponding to sixty four rasters, the data analysis unit transmits a subsequent subset of RGB image data corresponding to sixty four rasters upon reception of a transmission request from the image process unit 32. In addition, the image process unit 32 repeatedly makes requests for transmission of a subset of RGB image data corresponding to sixty four rasters to the data analysis unit 31 at intervals of a predetermined period.

A certain subset of RGB image data corresponding to sixty four rasters is input to the first input memory unit 35a. Further, a subsequent subset of RGB image data corresponding to sixty four rasters and having been transmitted by the data analysis unit 31 as a response to a subsequent transmission request from the image process unit 32 is input to the second input memory unit 35b. In this way, subsets of RGB image data each corresponding to sixty four rasters are each input to an alternately selected one of the first input memory unit 35a and the second input memory unit 35b. In addition, in the case where, a total number of rasters corresponding to a set of RGB image data having been received from the host computer 50 is not a number multiplied by sixty four, a subset of RGB data corresponding to rasters whose number is a remainder resulting from dividing the total number of the rasters corresponding to the set of RGB image data by sixty four is transmitted to the image process unit 32 as the last one of subsets of RGB data to be transmitted thereto.

Subsequently, the color conversion process unit 33 retrieves a block of RGB image data corresponding to two rasters from the subset of RGB data stored in the first input memory unit 35a, and performs the color conversion processing on the retrieved block of RGB image data. Further, a block of image data resulting from the color conversion processing is input to the first buffer unit 36. In addition, a subsequent block of image data resulting from the color conversion processing is input to the second buffer unit 37.

Subsequently, the halftone process unit 34 performs the halftone processing on the block of image data resulting from the color conversion processing and being stored in the first buffer unit 36. The halftone process unit 34 inputs a block of image data (a block of printing data) resulting from the halftone processing on the block of image data having been stored in the first buffer unit 36, into the first output memory unit 35c. Subsequently, this block of printing data stored in the first output memory unit 35c is transmitted to the data process unit 38.

The pass division process unit 38a of the data process unit 38 (refer to FIG. 1) performs the pass division processing on the received block of printing data, and outputs sub-blocks of printing data resulting from the pass division processing to the printing control unit 39 (refer to FIG. 1). Subsequently, the printing control unit 39 performs printing of an image corresponding to two rasters onto the continuous paper P by driving the PF motor 22 and the CR motor 23 (for these motors, refer to FIG. 1), on the basis of the sub-blocks of printing data resulting from the pass division processing.

As described above, the printing apparatus 11 repeats the image processing, the pass division processing, and the printing with respect to the subset of RGB image data stored in the first input memory unit 35a. Further, after the completion of printing based on all pieces of image data included in the subset of RGB image data stored in the first input memory unit 35a, the printing apparatus performs the image processing, the pass division processing, and the printing on a subset of RGB image data stored in the second input memory unit 35b in the same way as described above. In this way, the printing apparatus 11 performs the image processing, the pass division processing, and the printing on all pieces of RGB image data included in the set of RGB image data having been analyzed and output by the data analysis unit 31.

The operation of the printing apparatus 11 according to this embodiment will be described by using FIGS. 3A, 3B, and 4. In addition, in FIGS. 3A, 3B, and 4, for the sake of convenience, the color conversion processing and the halftone processing are denoted by "COLOR CONVERSION" and "H/T", respectively. Further, in FIGS. 3A, 3B, and 4, a number inside brackets indicates a corresponding image area that is associated with a block of image data corresponding to two rasters. Thus, for example, in the case where a member inside brackets is "1", it indicates an image area that is associated with a block of image data corresponding to two rasters and having been retrieved at a 1st time; and in the case where a member inside brackets is "2", it indicates an image area that is associated with a block of image data corresponding to two rasters and having been retrieved at a 2nd time.

Here, a printing apparatus provided with an image process unit constituted by a DSP including a single DSP core is assumed as a target of a comparison with the printing apparatus 11 of this embodiment. In addition, this assumed printing apparatus will be referred to as "a first hypothetical printing apparatus". The image process unit of this first hypothetical printing apparatus includes a color conversion process unit and a halftone process unit on the single DSP core. Thus, as shown FIG. 4, after having caused the color conversion process unit to perform the color conversion processing on a block of RGB data corresponding to two rasters, the first hypothetical printing apparatus causes the halftone process unit to perform the halftone processing on a block of image data resulting from the color conversion processing. The first hypothetical printing apparatus repeatedly performs such image processing for each block of RGB image data corresponding to two rasters. Thus, it takes a long time to complete the image processing on all blocks of RGB image data. Particularly, in the case where, just like in this embodiment, ten color inks are used for printing a high-quality image on the continuous paper P, it takes a significantly long time to complete the image processing on all blocks of RGB image data.

Figure 3A:
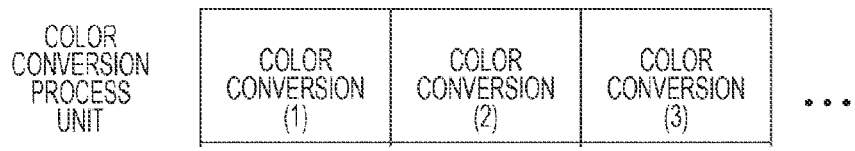
FIGS. 3A and 3B are diagrams illustrating image processing performed by the printing apparatus shown in FIG. 1.
Figure 3B:
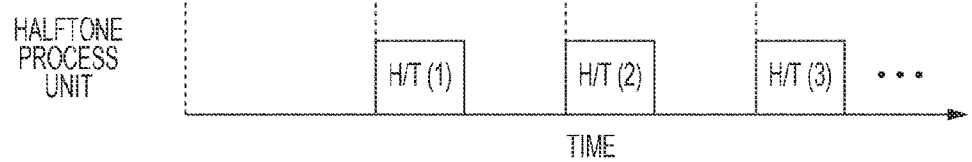
Figure 4:
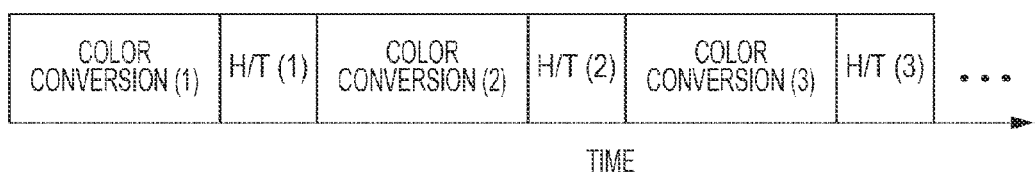
FIG. 4 is a time chart illustrating timing of processing and processing time with respect to color conversion processing and halftone processing performed by a printing apparatus that is a comparison example.

In this respect, in the printing apparatus 11 of this embodiment, since the color conversion process unit 33 and the halftone process unit 34 are constituted by respective DSP cores which are separately provided from each other, the printing apparatus 11 is capable of performing the color conversion processing and the halftone processing in parallel, as shown in FIGS. 3A and 3B. Specifically, with respect to a block of RGB data corresponding to two rasters and having been retrieved at a 1st time, this block of RGB data being an example of the first image area in the aforementioned aspect of the invention, the printing apparatus 11 performs the halftone processing subsequent to the completion of the color conversion processing. While performing the halftone processing on the block of RGB image data corresponding to two rasters and having been retrieved at the 1st time, the printing apparatus 11 performs the color conversion processing on a block of RGB image data corresponding to two rasters and having been retrieved at a 2nd time, this block of RGB image data being an example of the second image area in the aforementioned aspect of the invention. That is, halftone processing on the block of RGB image data corresponding to two rasters and having been retrieved at the 1st time and color conversion processing on the block of RGB image data corresponding to two rasters and having been retrieved at the 2nd time are performed in parallel with each other. In this way, halftone processing on a block of RGB image data corresponding to two rasters and having been retrieved at an M (M≥2) time and color conversion processing on a block of RGB image data corresponding to two rasters and having been retrieved at an (M+1) time are performed in parallel with each other, thereby making a period of time required to complete the image processing on all blocks of RGB data shorter, as compared with the case of the first hypothetical printing apparatus.

Here, a printing apparatus including two central process units (CPUs) is assumed as a target of a comparison with the printing apparatus 11 of this embodiment. Hereinafter, this printing apparatus will be referred to as "a second hypothetical printing apparatus". In an image process unit of this second hypothetical printing apparatus, a color conversion process unit and a halftone process unit are provided separately from each other. Thus, the second hypothetical printing apparatus is capable of performing the color conversion processing and the halftone processing on a block of RGB image data in parallel.

In the second hypothetical printing apparatus, however, since each of the color conversion unit and the halftone process unit is constituted by a CPU, a bus for transferring programs for execution of the image processing is made common to a bus for transferring image data. This configuration makes it difficult for a data analysis unit to, during a period when the color conversion processing is performed on a block of RGB image data, transmit a subset of RGB image data corresponding to sixty four rasters to the image process unit. For this reason, a period of time required to complete the image processing on all pieces of RGB data becomes long.

In this respect, in the printing apparatus 11 of this embodiment, the image process unit 32 is constituted by the two DSPs, and two kinds of buses, that is, the program memory bus 40 and the data memory bus 41, are provided. In this configuration, the color conversion processing on every block of RGB image data is performed by using the program memory bus 40, and the transfer of every subset of RGB image data corresponding to sixty four rasters from the data analysis unit 31 to the image process unit 32 is performed by using the data memory bus 41. Thus, this configuration makes it possible to, during a period when the color conversion processing is performed on a block of RGB image data, transfer a subset of RGB image data corresponding to sixty four rasters from the data analysis unit 31 to the image process unit. Accordingly, as compared with the case of the second hypothetical printing apparatus, a period of time required to complete the image processing on all pieces of RGB image data becomes shorter.

The printing apparatus 11 of this embodiment can bring about the following effects.

(1) The printing apparatus 11 performs three processes in parallel: a first one being the color conversion processing on a block of RGB image data; a second one being the halftone processing on a block of image data resulting from the color conversion processing; a third one being the transmission of a subset of RGB image data corresponding to sixty four rasters from the data analysis unit 31 to the image process unit 32. This configuration makes it possible to shorten a period of time required to complete the image processing on all pieces of RGB image data. That is, this configuration makes it possible to perform printing of an image on the continuous paper P without narrowing the sub-scanning direction size of each region existing on the continuous paper P and being subjected to printing through a corresponding pass of the printing head 17. Consequently, this configuration makes it possible to shorten a printing time.

The printing apparatus 11 performs the color conversion processing and the halftone processing on a block of image data corresponding to two rasters while performing printing operation. Thus, through a method of causing the image process unit 32 to perform the color conversion processing and the halftone processing in parallel, it is possible to shorten an interval between a completion of the image processing on a block of image data corresponding to two rasters and a subsequent completion of the image processing on a subsequent block of image data corresponding to two rasters. Accordingly, during a period when a printing operation by the printing head 17 with respect to a block of image data corresponding to two rasters is performed, it is possible to complete the color conversion processing and the halftone processing on a subsequent block of image data corresponding to two rasters.

(2) While the halftone process unit 34 performs halftone processing on a block of image data corresponding to two rasters and resulting from the color conversion processing, the color conversion process unit 33 performs the color conversion processing on a subsequent block of RGB image data corresponding to two rasters. Accordingly, this configuration makes it possible to shorten a period of time required to complete the image processing on all pieces of RGB image data.

(3) The image process unit 32 includes the first buffer unit 36 and the second buffer unit 37. Thus, this configuration makes it possible for the image process unit 32 to, while performing the halftone processing on a block of RGB image data corresponding to two rasters on the first buffer unit 36, input a subsequent block of RGB image data corresponding to two rasters into the second buffer unit 37. Accordingly, this configuration makes it possible for the image process unit 32 to perform the color conversion processing and the halftone processing in parallel and, as a result, this configuration shortens a period of time required to complete the image processing on all pieces of RGB image data.

Further, the first buffer unit 36 and the second buffer unit 37 are faster memories than the data memory unit 35. Thus, as compared with a configuration in which blocks of image data are transferred between the data memory unit 35 and each of the color conversion process unit 33 and the halftone process unit 34, this configuration makes data transfer time for the blocks of image data shorter. Accordingly, this configuration makes it possible to shorten a period of time required to complete the image processing on all pieces of RGB image data.

It is to be noted here that the configuration of the aforementioned embodiment may be changed as described below.

The data process unit 38 may be configured to, in addition to the pass division process unit 38a, include a rasterization process unit. This rasterization process unit receives a block of dot data from the halftone process unit 34, and performs interlace processing for rearranging the order of pieces of dot data included in the received block of dot data, in view of order of forming dots, into order in accordance with which each of the pieces of dot data is to be transferred to the printing control unit 39. Further, the data process unit 38 may be configured to include the rasterization process unit in substitution for the pass division process unit 38a.

The color conversion process unit 33 may be configured to perform color conversion processing for converting a block of RGB image data into a block of image data for printing, corresponding to colors whose number is other than ten.

The color conversion process unit 33 may be configured to perform color conversion processing for each block of RGB image data corresponding to three or more rasters. That is, the color conversion process unit 33 may be configured so as to be capable of performing the color conversion processing for each block of RGB image data corresponding to rasters whose data volume is up to a data volume of pieces of image data which can be retained by the first buffer unit 36 and the second buffer unit 37. Further, the color conversion process unit 33 may be configured to perform the color conversion for each block of RGB image data corresponding to one raster.

The halftone process unit 34 may be configured to convert a block of image data resulting from the color conversion processing into a block of multi-grayscale-level image data other than the block of 2-grayscale-level image data, such as a block of 4-grayscale-level image data. This block of 4-grayscale-level image data includes, for each pixel, pieces of dot data each being associated with a corresponding one of the colors and indicating which of four kinds of dot formations is to be applied to a dot corresponding to the relevant pixel: a first one being a dot formation in which a large-size dot is formed; a second one being a dot formation in which a middle-size dot is formed; a third one being a dot formation in which a small-size dot is formed; a fourth one being a dot formation in which no dot is formed.

The image process unit 32 is not limited to a configuration in which the color conversion processing and the halftone processing are performed always in parallel. For example, the image process unit 32 may be configured such that there exists a period during which each of at least one of the color conversion processing and the halftone processing is performed so as not to be in parallel with the other one thereof. That is, the image process unit may be configured to perform the color conversion processing and the halftone processing in parallel during at least part of a period when each block of image data is subjected to the color conversion processing and the halftone processing in series. According to this configuration, an effect equivalent to the effect (1) of the above embodiment can be brought about.

The image process unit 32 may be configured to omit any one of the first program memory unit 33a and the second program memory unit 34a. In this case, the program for the color conversion processing and the program for the halftone processing are stored in the other one of the first program memory unit 33a and the second program memory unit 34a.

The image process unit 32 may be configured to include three or more buffer units. Further, the image process unit 32 may be configured to omit any one of the first buffer unit 36 and the second buffer unit 37.

The control apparatus 30 may be configured to omit the data process unit 38.

The external apparatus may be a USB memory in substitution for the host computer 50. That is, any device capable of transmitting print jobs to the printing apparatus 11 is sufficient as the external apparatus.

The printed medium is not limited to paper, such as the continuous paper P, but may be a different kind of medium, such as a film, a woven fabric, or a nonwoven fabric; or a product, such as one of various kinds of substrates including a glass substrate, a silicon substrate, and the like.

The entire disclosure of Japanese Patent Application No. 2014-129575, filed Jun. 24, 2014 is expressly incorporated by reference herein.

What is claimed is:

1. A printing apparatus comprising:
a printing head through which printing onto a printed medium is performed;
a data analysis unit that analyzes a print job received from an external apparatus and outputs a printing command and a first set of image data; and
an image process unit that performs image processing for converting the first set of image data into a set of printing data on the basis of which the printing onto the printed medium is performed,
wherein the image process unit includes a program memory bus that communicably interconnects the data analysis unit and the image process unit and carries the printing command, a data memory bus that communicably interconnects the data analysis unit and the image process unit and carries the first set of image data, a program memory unit that stores therein a program for the image processing, a data memory unit that stores therein the first set of image data input from the data analysis unit, a color conversion process unit that performs color conversion processing on the first set of image data on the basis of the printing command and the program for the image processing, and a halftone process unit that performs halftone processing on a second set of image data resulting from the color conversion processing on the first set of image data, on the basis of the printing command and the program for the image processing, and
wherein the image process unit performs the color conversion processing and the halftone processing in parallel.

2. The printing apparatus according to claim 1, wherein, among a plurality of image areas corresponding to the first set of image data, an image area and another image area that is different from the image area are image-processed by the color conversion unit and the halftone process unit, respectively, in parallel with each other.

3. The printing apparatus according to claim 2,
wherein the image process unit further includes a first buffer unit and a second buffer unit,
wherein, among the plurality of image areas corresponding to the first set of image data, a first image area and a second image area that is different from the first image area are input to the first buffer unit and the second buffer unit, respectively, and
wherein the color conversion process unit performs the color conversion processing on the second image area during a period when the halftone process unit performs the halftone processing on the first image area.

4. The printing apparatus according to claim 1, further comprising a data process unit that is formed separately from the image process unit and that performs pass division processing for dividing the set of printing data input from the image process unit into subsets of printing data each associated with a corresponding one of passes that are movements of the printing head in a main-scanning direction.

* * * * *